United States Patent
Iwamitsu et al.

(10) Patent No.: US 10,421,450 B2
(45) Date of Patent: Sep. 24, 2019

(54) VEHICLE WITH FIRST AND SECOND POWER SOURCES

(71) Applicant: HONDA MOTOR CO., LTD., Tokyo (JP)

(72) Inventors: Atsuki Iwamitsu, Wako (JP); Mitsuo Muraoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 40 days.

(21) Appl. No.: 15/599,629

(22) Filed: May 19, 2017

(65) Prior Publication Data

US 2017/0334431 A1    Nov. 23, 2017

(30) Foreign Application Priority Data

May 20, 2016   (JP) .................................. 2016-101885

(51) Int. Cl.
| | | |
|---|---|---|
| *B60W 20/15* | (2016.01) | |
| *B60K 6/48* | (2007.10) | |
| *B60W 10/02* | (2006.01) | |
| *B60W 10/06* | (2006.01) | |
| *B60W 10/08* | (2006.01) | |
| *B60W 20/40* | (2016.01) | |
| *B60W 30/188* | (2012.01) | |
| *B60K 7/00* | (2006.01) | |

(Continued)

(52) U.S. Cl.
CPC ............... *B60W 20/15* (2016.01); *B60K 6/48* (2013.01); *B60K 7/0007* (2013.01); *B60K 17/356* (2013.01); *B60W 10/02* (2013.01); *B60W 10/06* (2013.01); *B60W 10/08* (2013.01); *B60W 20/40* (2013.01); *B60W 30/188* (2013.01); *B60K 17/043* (2013.01); *B60W 2510/0275* (2013.01); *B60W 2510/0666* (2013.01); *B60W 2510/085* (2013.01); *B60W 2540/10* (2013.01); *B60W 2710/021* (2013.01); *B60W 2710/027* (2013.01); *B60W 2710/0677* (2013.01); *B60W 2710/086* (2013.01); *B60Y 2200/92* (2013.01); *Y02T 10/7258* (2013.01); *Y10S 903/93* (2013.01)

(58) Field of Classification Search
CPC ...... B60W 20/15; B60W 20/40; B60W 10/02; B60W 10/06; B60W 10/08; B60W 30/188
See application file for complete search history.

(56) References Cited

U.S. PATENT DOCUMENTS

| | | | | |
|---|---|---|---|---|
| 6,203,468 | B1 * | 3/2001 | Nitta ..................... | B60W 10/02 477/5 |
| 2007/0275823 | A1 * | 11/2007 | Motosugi ................. | B60K 6/48 477/176 |

(Continued)

FOREIGN PATENT DOCUMENTS

| | | |
|---|---|---|
| JP | 2011-79379 A | 4/2011 |
| JP | 2012-50315 A | 3/2012 |

(Continued)

*Primary Examiner* — Huan Le
(74) *Attorney, Agent, or Firm* — Westerman, Hattori, Daniels & Adrian, LLP

(57) ABSTRACT

The power controller, when switching from the second power-source drive to the first power-source drive, determines a specified power of the second power-source based on a ratio of the target transmission capacity of a clutch to the target vehicle power, and controls the second power-source based on the specified power.

5 Claims, 6 Drawing Sheets

(51) Int. Cl.
    *B60K 17/356*      (2006.01)
    *B60K 17/04*       (2006.01)

(56) References Cited

U.S. PATENT DOCUMENTS

2013/0297128 A1* 11/2013 Takamura ................ B60K 6/48
                                                 701/22
2015/0239467 A1*  8/2015 Wang ....................... B60K 6/48
                                                  477/5

FOREIGN PATENT DOCUMENTS

JP          2015-123784 A      7/2015
JP          2015-123849 A      7/2015

* cited by examiner

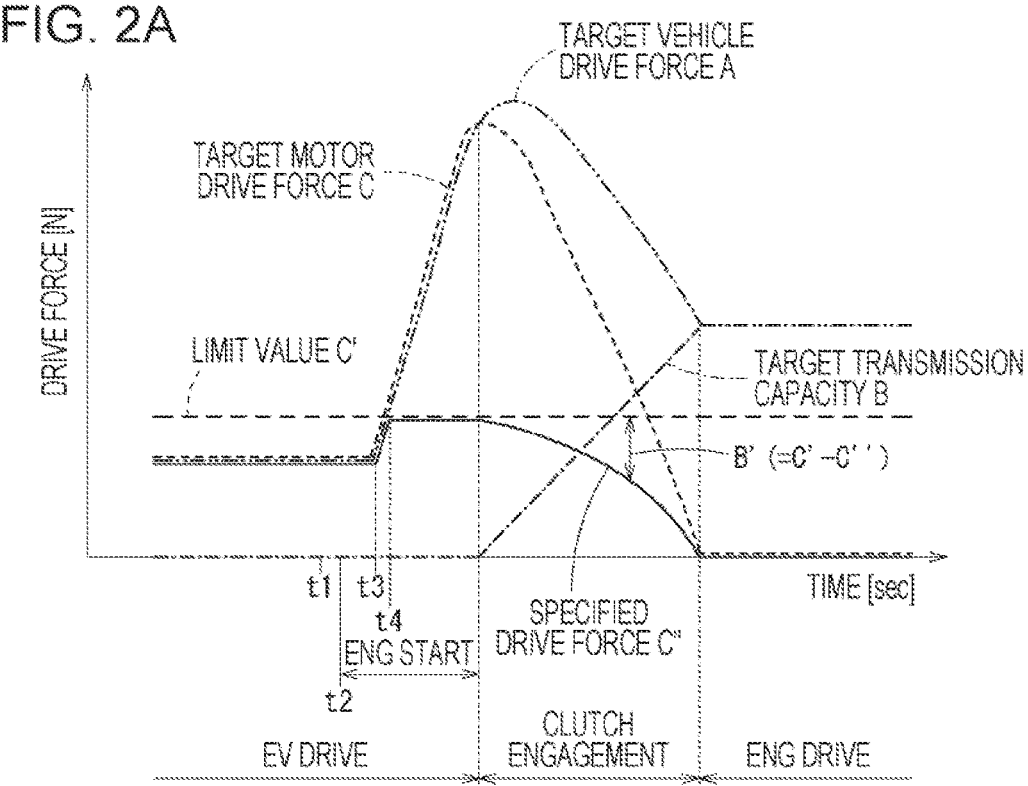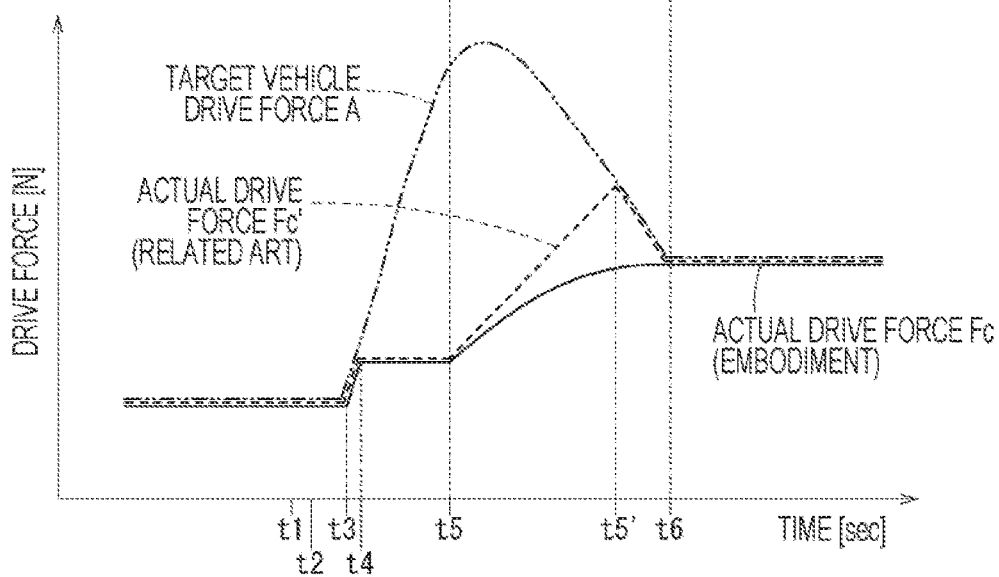

VEHICLE WITH FIRST AND SECOND POWER SOURCES

CROSS REFERENCES TO RELATED APPLICATIONS

The present application claims priority under 35 U.S.C. § 119 to Japanese Patent Application No. 2016-101885, filed May 20, 2016, entitled "Vehicle." The contents of this application are incorporated herein by reference in their entirety.

TECHNICAL FIELD

The present disclosure relates to a vehicle that includes a first power source and a second power source which drive part of wheels, and that performs control to switch from the second power source drive to the first power source drive.

BACKGROUND

Japanese Unexamined Patent Application Publication No. 2015-123849 discloses a vehicle in which an engine is coupled to a front wheel (or rear wheel) via a clutch, and a motor is coupled to a rear wheel (or front wheel). The engine, the motor, and the clutch are controlled by a power control device. When multiple power sources (the engine and the motor) are provided as in the vehicle disclosed in Japanese Unexamined Patent Application Publication No. 2015-123849, for the purpose of energy efficiency, switching may be performed from drive by one of the power sources to drive by the other of the power sources. For instance, when a driver depresses the accelerator pedal while the vehicle is moving by the drive force of a motor, switching may be performed from the motor drive to the engine drive. In this situation, the power control device subtracts a target value (target transmission capacity) of the drive force of the engine, transmitted to a wheel via the clutch from a target value (target vehicle power) of the drive force of the vehicle, and assigns the calculated value to a specified drive force (specified power) of the motor.

In devices, response/communication delay occurs. Due to the delay, when the motor is controlled with a specified drive force determined by the above conventional subtraction method in related art, so-called overshoot is likely to occur. The overshoot is a phenomenon in which when the actual drive force of the engine approaches the target vehicle drive force, the actual drive force of the vehicle exceeds the target vehicle power. When overshoot occurs, a driver feels something strange about the behavior of the vehicle.

SUMMARY

The present disclosure has been made in consideration of such a problem, and it is desirable to provide a vehicle capable of smoothly switching from one power source drive to the other power source drive.

The present application describes, for example, a vehicle including a first power source that drives a wheel, a second power source that drives the wheel or another wheel, a clutch that is provided on a power transmission path between the wheel and the first power source, and that is disengaged or engaged according to a pressure to cause the power transmission path to be a disconnected state or a connected state, target power input unit that receives an input from a driver for setting a target vehicle power that is a target value of power generated by the first power source and the second power source, and setting a target transmission capacity that is a target value of an output limit value of the clutch, a power controller that controls the first power source and the second power source based on the target vehicle power, and a clutch controller that controls the pressure to be applied to the clutch, based on the target transmission capacity. Here, the power controller, when switching from drive by the second power source to drive by the first power source, determines a specified power of the second power source based on a ratio of the target transmission capacity to the target vehicle power, and controls the second power source based on the specified power.

According to the present disclosure, for example, when drive by the second power source is switched to drive by the first power source, a specified power of the second power source is determined based on a ratio of the target transmission capacity to the target vehicle power, and the second power source is controlled based on the specified power. When the second power source is controlled with a specified power determined by the ratio, the overshoot in which the actual drive force exceeds the target vehicle power can be suppressed more compared with the case where the second power source is controlled with a specified power determined by subtraction. As a consequence, switching between the power sources can be smoothly performed. In addition, even when an error occurs in the target vehicle power and the target transmission capacity, the effect of the error on the specified power can be reduced by using the ratio.

In the aforementioned configuration, a target value (target transmission capacity) of the output limit value of the clutch is used instead of the actual power transmitted from the first power source to wheels via the clutch. Although the actual power is estimated from an actual measurement value of a pressure applied to the clutch, an error may be included in the estimated value. However, the target value is not affected by the error. Moreover, although the estimated value of the actual power is affected by a disturbance, the target value is not affected by a disturbance. In addition, when an estimated value of the actual power is used, a control delay occurs, whereas when a target value is used, no control delay occurs.

The power controller may determine the specified power of the second power source using 1−(the target transmission capacity/the target vehicle power). As time elapses, (the target transmission capacity/the target vehicle power) approaches 1, and thus 1−(the target transmission capacity/the target vehicle power) approaches 0. Therefore, the specified power of the second power source can be gradually made closer to 0 by using the value, 1−(the target transmission capacity/the target vehicle power). As the result, switching between the power sources can be smoothly performed.

The power controller may determine a target power of the second power source by subtracting the target transmission capacity from the target vehicle power, and determines the specified power of the second power source by multiplying the target power by 1−(the target transmission capacity/the target vehicle power). As time elapses, (the target transmission capacity/the target vehicle power) approaches 1, and thus 1−(the target transmission capacity/the target vehicle power) approaches 0. Therefore, the specified power of the second power source can be gradually made closer to 0 by multiplying a target power by the value, 1−(the target transmission capacity/the target vehicle power). As a consequence, switching between the power sources can be smoothly performed.

According to the present disclosure, for example, when control is performed to switch from the second power source drive to the first power source drive, it is possible to suppress overshoot in which the actual drive force exceeds the target vehicle power. As a consequence, switching between the power sources can be smoothly performed.

BRIEF DESCRIPTION OF THE DRAWINGS

The advantages of the disclosure will become apparent in the following description taken in conjunction with the following drawings.

FIG. 2A is a graph illustrating a target vehicle drive force, a target transmission capacity, a target motor drive force, a limit value, and a specified drive force that vary as time elapses. FIG. 2B is a graph illustrating a target vehicle drive force, the actual drive force obtained by the present disclosure, and the actual drive force obtained by related art that vary as time elapses.

DESCRIPTION OF THE PREFERRED EMBODIMENTS

Hereinafter, a preferred embodiment will be taken and described in detail with reference to the accompanying drawings. In the present description, the power of a vehicle 10 and the output of power sources (an engine 12, first to third traction motors 14, 16, 18) are also referred to as a "drive force [N]". The drive force of the engine 12 and the first to third traction motors 14, 16, 18 can be defined as a wheel end drive force [N], and can be calculated from a torque [Nm], a gear ratio of a transmission 34, and a wheel dynamic radius [m].

I. Embodiment

[1. Configuration]
(1-1. Entire Configuration)

Figure 1:
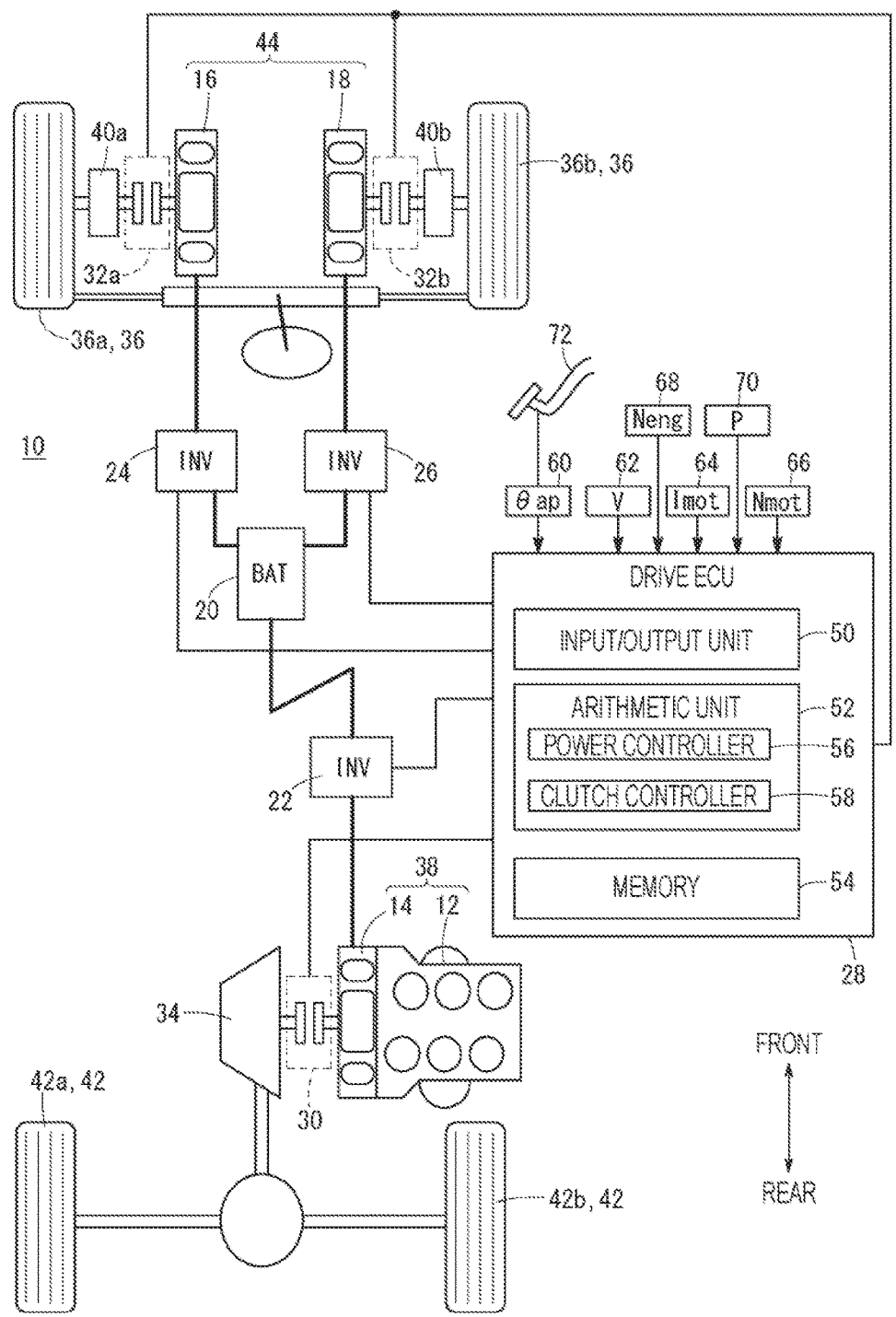
FIG. 1 is a schematic configuration diagram of a drive system and its periphery of a vehicle according to an embodiment of the present disclosure.

FIG. 1 is a schematic configuration diagram of a drive system and its periphery of a vehicle 10 according to an embodiment of the present disclosure. As illustrated in FIG. 1, the vehicle 10 includes an engine 12 and a first traction motor 14 disposed in series in the back of the vehicle 10, second and third traction motors 16, 18 disposed in the front of the vehicle 10, a high-voltage battery 20, first to third inverters 22, 24, 26, a drive electronic control unit 28, first to third clutches 30, 32$a$, 32$b$, and a transmission 34.

Hereinafter, the first traction motor 14 is referred to as the "first motor 14" or "motor 14". The second traction motor 16 is referred to as the "second motor 16" or "motor 16". The third traction motor 18 is referred to as the "third motor 18" or "motor 18". The high-voltage battery 20 is referred to as the "battery 20". The drive electronic control unit 28 is referred to as the "drive ECU 28" or "ECU 28".

The engine 12 and the first motor 14 are coupled to a left rear wheel 42$a$ and a right rear wheel 42$b$ (hereinafter collectively referred to as a "rear wheel 42" or "wheel 42") via the first clutch 30 and the transmission 34. The engine 12 and the first motor 14 constitute a first power source 38 (hereinafter also referred to as a "power source 38"). The first clutch 30 receives an input of a drive force F1 (=F1$e$+F1$m$) which is the sum of a drive force F1$e$ of the engine 12 and a drive force F1$m$ of the first motor 14, and outputs a drive force F1' to the rear wheel 42. Although the first power source 38 is disposed in the back of the vehicle 10 in FIG. 1, the first power source 38 may be disposed in the front of the vehicle 10.

The output shaft of the second motor 16 is coupled to the rotational shaft of a left front wheel 36$a$ via the second clutch 32$a$ and a reduction gear 40$a$. The second clutch 32$a$ receives an input of a drive force F2$a$ from the second motor 16 and outputs a drive force F2$a$' to a left front wheel 36$a$. The output shaft of the third motor 18 is coupled to the rotational shaft of a right front wheel 36$b$ via the third clutch 32$b$ and a reduction gear 40$b$. The third clutch 32$b$ receives an input of a drive force F2$b$ from the third motor 18 and outputs a drive force F2$b$' to a right front wheel 36$b$. The second and third motors 16 and 18 constitute a second power source 44 (hereinafter also referred to as a "power source 44"). Hereinafter, the left front wheel 36$a$ and the right front wheel 36$b$ are collectively referred to as a "front wheel 36" or "wheel 36". When the second and third clutches 32$a$, 32$b$ are completely engaged, a drive force F2 (=F2$a$+F2$b$) generated by the second power source 44 is equal to a drive force F2' (=F2$a$'+F2$b$') transmitted to the front wheel 36. When the reduction gears 40$a$, 40$b$ are formed with a planetary gear, as a substitute for the second clutch 32$a$ and the third clutch 32$b$, a hydraulic brake may be used. Such hydraulic brake is described in, for example, Japanese Unexamined Patent Application Publication No. 2012-050315, the entire contents of which are incorporated herein by reference.

For instance, at a low speed, the vehicle 10 is driven by the second and third motors 16, 18, at an intermediate speed, the vehicle 10 is driven by the engine 12 and the second and third motors 16, 18, and at a high speed, the vehicle 10 is driven by the engine 12 and the first motor 14. During the drive by the second and third motors 16, 18, when an accelerator pedal 72 is further depressed, the drive power is switched to the engine 12 and/or the first motor 14. Also, at a low speed (or an intermediate speed), the first motor 14 may be driven by the engine 12 in a state where the first power source 38 and the transmission 34 are disconnected (or connected) by the first clutch 30, thereby causing the first motor 14 to generate power, and the generated power may also be supplied to the second and third motors 16, 18 or an auxiliary device which is not illustrated, or charged to the battery 20. In other words, the first motor 14 may also be used as a power generator.

The battery 20 supplies power to the first to third motors 14, 16, 18 via the first to third inverters 22, 24, 26, and is charged with regenerative power Preg from the first to third motors 14, 16, 18.

The drive ECU 28 controls the engine 12 and the first to third inverters 22, 24, 26 based on the output from various sensors and electronic control units (hereinafter referred to as an "ECU"), thereby controlling the output of the engine 12 and the first to third motors 14, 16, 18. In addition, the drive ECU 28 controls the first to third clutches 30, 32a, 32b. Although not illustrated, the drive ECU 28 controls the transmission 34. The drive ECU 28 has an input/output unit 50, an arithmetic unit 52, and a memory 54. The drive ECU 28 may be a combination of multiple ECUs. The drive ECU 28 may include, for instance, multiple ECUs each of which is provided in corresponding one of the engine 12 and the first to third motors 14, 16, 18, an ECU that manages drive states of the engine 12 and the first to third motors 14, 16, 18, and an ECU that controls the operation of the transmission 34 and the first to third clutches 30, 32a, 32b.

The arithmetic unit 52 of the ECU 28 has a power controller 56 and a clutch controller 58. The controllers 56, 58 are each implemented by executing a program stored in the memory 54 by the arithmetic unit 52, or may be implemented by hardware such circuitry. The power controller 56 controls the output of the first power source 38 and the second power source 44 based on a target total vehicle drive force A (described later). The clutch controller 58 controls a pressure (hydraulic pressure P) to be applied to the first clutch 30 based on a target clutch drive force transmission capacity B (described later).

The ECU 28 switches the "drive state" of the vehicle 10 between rear wheel drive (RWD), front wheel drive (FWD), and all wheel drive (AWD) states. Each of RWD and FWD is 2 wheel drive (2WD), and AWD is 4 wheel drive (4WD). In addition, during deceleration of the vehicle 10, the ECU 28 performs a regenerative operation by at least one of the first to third motors 14, 16, 18 according to the most recent drive state.

The various sensors that supply output to the drive ECU 28 include, for instance, an accelerator pedal opening sensor 60, a vehicle speed sensor 62, a current sensor 64, a rotational speed sensors 66, 68, and a hydraulic sensor 70.

(1-2. Configuration and Function of Each Unit)

The engine 12 is, for instance, a six-cylinder engine, however, may be another type of engine such as a two-cylinder, four-cylinder or eight-cylinder engine. The engine 12 is not limited to a gasoline engine, and may be an engine such as a diesel engine or an air engine.

The first to third motors 14, 16, 18 are, for instance, three-phase AC brushless motors, however, may be another type of motor such as a three-phase AC brush motor, a single-phase AC motor, or a DC motor. The specification of the first to third motors 14, 16, 18 may be the same or may be different.

The first to the third inverters 22, 24, 26 have a three-phase bridge configuration and perform DC/AC conversion to convert DC to three-phase AC, and supply the three-phase AC to the first to third motors 14, 16, 18, and concurrently, supplies DC obtained by AC/DC conversion to the battery 20, the AC/DC conversion being caused by a regenerative operation of the first to third motors 14, 16, 18.

The battery 20 is a power storage device (energy storage) including multiple battery cells, and for instance, a lithium-ion rechargeable battery, a nickel hydride rechargeable battery or a capacitor may be utilized. A lithium-ion rechargeable battery is utilized in this embodiment. It is to be noted that a DC/DC converter (not illustrated) may be provided between the first to third inverters 22, 24, 26 and the battery 20 to increase or decrease the output voltage of the battery 20 or the output voltage of the first to third motors 14, 16, 18.

The first to third clutches 30, 32a, 32b are each a hydraulic clutch including a disc connected to the output shafts of the power sources 38, 44, and a plate connected to the rotational shaft of the transmission 34 or the reduction gears 40a, 40b. The first to third clutches 30, 32a, 32b disengage or engage the disc from or with the plate according to the hydraulic pressure P controlled by the ECU 28, and sets a power transmission path from the first to third clutches 30, 32a, 32b to the wheels 36, 42 to a disconnected state or a connected state. The drive forces F1', F2a', F2b' outputted from the first to third clutches 30, 32a, 32b are determined by the drive forces F1, F2a, F2b of the power sources 38, 44, and the output limit value (clutch drive force transmission capacity) of the first clutch 30 determined according to the hydraulic pressure P. When the drive forces F1, F2a, F2b are less than the output limit value, the drive forces F1', F2a', F2b' are equal to the drive forces F1, F2a, F2b, respectively. On the other hand, when the drive forces F1, F2a, F2b are greater than or equal to the output limit value, the drive forces F1', F2a', F2b' are equal to the output limit value.

The drive system of the vehicle 10 is described in, for example, Japanese Unexamined Patent Application Publication Nos. 2015-123849, 2015-123784, 2012-050315, or 2011-079379, the entire contents of which are incorporated herein by reference. For instance, a hydraulic pump, a solenoid, or an one-way clutch (which are not illustrated) is provided in the second and third motors 16, 18, and is controlled by the drive ECU 28 as necessary, and thereby the operation of the second and third motors 16 and 18 can be controlled.

The accelerator pedal position sensor 60 detects a degree of opening (hereinafter referred to as an "AP opening θap") of the accelerator pedal 72. The vehicle speed sensor 62 detects a vehicle speed V [km/h]. The current sensor 64 detects an input/output current Imot [A] of the first to third motors 14, 16, 18. The rotational speed sensor 66 detects a number of revolutions Nmot [rpm] per unit of time of the first to third motors 14, 16, 18. The rotational speed sensor 68 detects a number of revolutions Neng [rpm] per unit of time of the engine 12 (hereinafter also referred to as an "engine rotational speed Neng"). The hydraulic sensor 70 detects a hydraulic pressure P [Pa] applied to the first clutch 30.

[2. Switching Control from Second Power Source 44 to First Power Source 38]

Hereinafter, as an example of this embodiment, the control of switching from EV drive in which the vehicle 10 is driven by the motors 16, 18 (the second power source 44) to ENG drive in which the vehicle 10 is driven by the engine 12 (the first power source 38) will be described.

In general, when the responsiveness is compared between an engine, a hydraulic clutch, and a motor, the motor has the fastest responsiveness. The hydraulic clutch also has relatively faster responsiveness. The engine has the slowest responsiveness. Based on this fact, in the following example, the second and third clutches 32a, 32b are completely engaged, and the second and third inverters 24, 26 are controlled, in other words, the motors 16, 18 are controlled. Thus, the drive force F2' transmitted to the front wheel 36 is equal to the drive force F2 of the motors 16, 18. On the other hand, the drive force F1e of the engine 12 is transmitted to the rear wheel 42 as the drive force F1' via the first clutch 30.

(2-1. Example 1 of Switching Control (when Target Motor Drive Force C≥Limit Value C'))

FIG. 2A is a graph illustrating a target vehicle drive force A, a target transmission capacity B, a target motor drive force C, a limit value C', and a specified drive force C" that vary as time elapses. FIG. 2B is a graph illustrating the target vehicle drive force A, the actual drive force Fc obtained by the present disclosure, and the actual drive force Fc' obtained by related art that vary as time elapses. FIGS. 2A and 2B illustrate changes in the target values, the specified value, and the rated value when the target motor drive force C reaches the limit value C' of the motors 16, 18. It is to be noted that in FIGS. 2A and 2B, in order to facilitate visual recognition of the changes in the target values, the specified value, and the rated value, overlapping portions are shifted.

In the following, the target values, the specified value, and the rated value used in this embodiment will be described. In this embodiment, in order to smoothly perform the control of switching from EV drive to ENG drive, in a transitional stage of the control of switching, the specified value of the drive force F2 transmitted from the motors 16, 18 to the front wheel 36 is determined by a unique calculation. In this embodiment, when the motors 16, 18 are controlled, the "specified drive force C'''" is calculated as the specified value. The "specified drive force C'''" is calculated based on the "target total vehicle drive force A", the "target clutch drive force transmission capacity B", the "target motor drive force C" and the "limit value C'".

The target total vehicle drive force A (hereinafter referred to as the "target vehicle drive force A") refers to a target value (target vehicle power) of a drive force Ftar (=F1'+F2) needed for the vehicle 10 to satisfy a request of a driver. The target vehicle drive force A is determined based on, for instance, the AP opening θap and/or the vehicle speed V. The target clutch drive force transmission capacity B (hereinafter referred to as the "target transmission capacity B") refers to a target value of the output limit value of the first clutch 30. The target transmission capacity B is determined based on, for instance, the target vehicle total drive force A or the AP opening θap and/or the vehicle speed V. The target motor drive force C refers to a target value of the drive force F2 outputted from the second and third motors 16, 18 (the second power source 44). The target motor drive force C is determined by subtraction (A−B) between the target vehicle drive force A and the target transmission capacity B. The limit value C' is a limit value (rated value) of the drive force F2 outputted from the second and third motors 16, 18. The specified drive force C'' is a specified control value of the second and third motors 16, 18 (the second power source 44). The specified drive force C'' is determined by the following calculation: C'×(A−B)/A [=C'×{1−(B/A)}] or C×(A−B)/A [=C×{1−(B/A)}].

As illustrated in FIG. 2A, before time t1, the vehicle 10 performs EV drive that uses the second and third motors 16, 18 as the power source. During EV drive, the target vehicle drive force A, the target motor drive force C, and the specified drive force C'' are equal. The ECU 28 controls the second and third inverters 24, 26 based on the specified drive force C'' (the target motor drive force C), thereby controlling the drive force F2 of the second and third motors 16, 18.

At time t1, a driver further depresses the accelerator pedal 72. At time t2, the ECU 28 determines whether or not switching is performed from the drive (EV drive) by the second and third motors 16, 18 to the drive (ENG drive) by the engine 12, based on, for instance, the gear level set by the AP opening θap, the vehicle speed V, and the transmission 34. Here, the ECU 28 determines that switching to ENG drive is necessary, and starts the engine 12. At this point, when the engine 12 is already in operation, it is unnecessary to start the engine 12. At time t3, the ECU 28 increases the target vehicle drive force A. As the target vehicle drive force A is increased, the specified drive force C'' is also increased. It is to be noted that the intervals between time t1, time t2 and time t3 are determined in consideration of a response/communication delay of each device.

At time t4, the target motor drive force C reaches or exceeds the limit value C'. When the target motor drive force C reaches or exceeds the limit value C', the ECU 28 controls the drive force F2 of the second and third motors 16, 18 based on the limit value C'. Specifically, the ECU 28 assigns the limit value C' to the specified drive force C''.

Although the drive force F1 of the first power source 38 is not illustrated in FIGS. 2A and 2B, after time t3 (or after time t2), the ECU 28 monitors the engine 12 and determines whether or not the engine 12 has been started. At this point, the drive force F1e of the engine 12 may be monitored. The drive force F1e of the engine 12 can be determined based on, for instance, engine output characteristics stored in the memory 54. The engine output characteristics refer to the correspondence relationship between the engine rotational speed Neng and the drive force F1e (or torque). The ECU 28 continues EV drive and until the engine 12 is started, and controls the drive force F2 of the second and third motors 16, 18 based on the value of a smaller one of the target motor drive force C and the limit value C'. In other words, the ECU 28 assigns the value of a smaller one of the target motor drive force C and the limit value C' to the specified drive force C''.

At time t5, the start of the engine 12 is completed. After the engine 12 has been started, the ECU 28 determines sharing rates for the first power source 38 and the second power source 44 in order to achieve the target vehicle drive force A, and determines the target transmission capacity B based on the sharing rate for the first power source 38. The ECU 28 then controls the hydraulic pressure P based on the target transmission capacity B, and engages the first clutch 30. At this point, the ECU 28 controls the engine 12 so that the drive force F1e of the engine 12 at least exceeds the target transmission capacity B. The engagement of the first clutch 30 allows the drive force F1' to be transmitted to the rear wheel 42. In addition, the ECU 28 determines the specified drive force C'' by the calculation, C'×(A−B)/A [=C'×{1−(B/A)}], and controls the drive force F2 of the second and third motors 16, 18 based on the determined specified drive force C''. The specified drive force C'' is decreased as the target transmission capacity B is increased. In this manner, at time t5 and after, the drive force F1' outputted from the first clutch 30 is increased and the drive force F2 of the second and third motors 16, 18 is decreased.

At time t6, the target vehicle drive force A and the target transmission capacity B determined by the ECU 28 are approximately equal. As a consequence, the specified drive force C'' becomes approximately zero. At this point, the actual drive force Fc of the vehicle 10 is approximately equal to the target transmission capacity B. In other words, switching from EV drive to ENG drive is completed. It is to be noted that the engagement of the first clutch 30 increases the target transmission capacity B sufficiently to allow the drive force F1 to be transmitted. For this reason, the target transmission capacity B at time t6 and after is not illustrated in FIG. 2A.

Here, let B' (see FIG. 2A) be the difference between the limit value C' and the specified drive force C'', then note that the relationship B/A=B'/C' is satisfied.

Referring to FIG. 2B, the actual drive force Fc obtained in this embodiment is compared with the actual drive force Fc' obtained by related art. The actual drive force Fc' in related art reaches the target vehicle drive force A at time t5' in the latter half of a transitional stage of the control of switching. Then, at time t5' and after, overshoot, in which the actual drive force Fc' exceeds the target vehicle drive force A, is likely to occur. In contrast, since the actual drive force Fc in this embodiment gradually approaches the target vehicle drive force A, no overshoot occurs.

(2-2. Example 2 of Switching Control (when Target Motor Drive Force C<Limit Value C'))

Figure 3A:
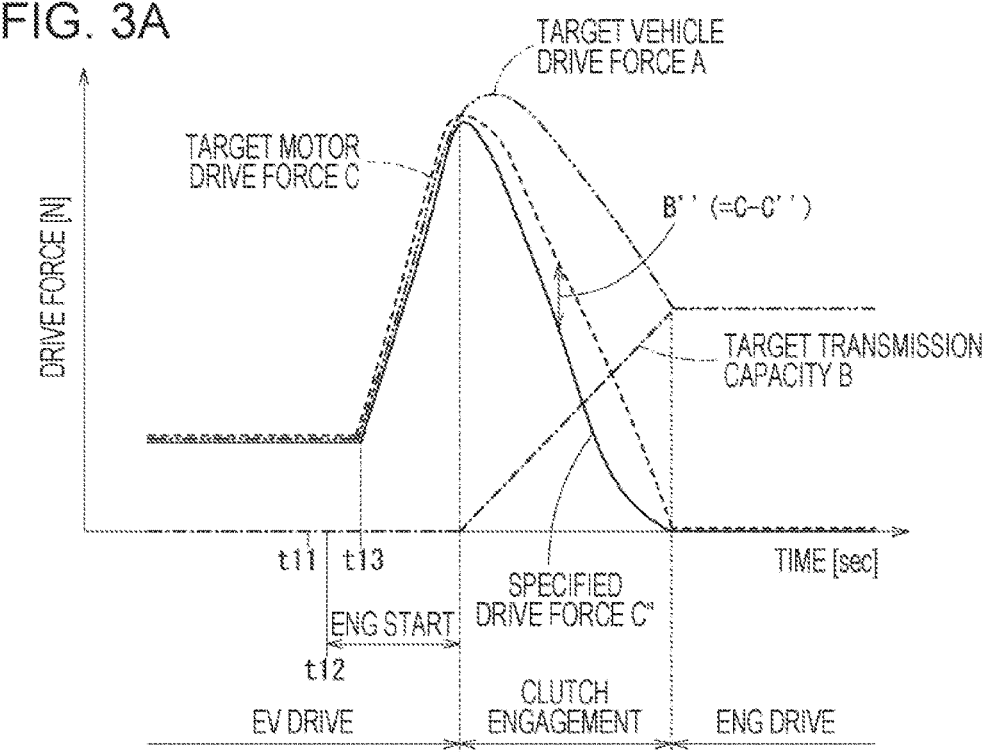
FIG. 3A is a graph illustrating a target vehicle drive force, a target transmission capacity, a target motor drive force, and a specified drive force that vary as time elapses.
Figure 3B:
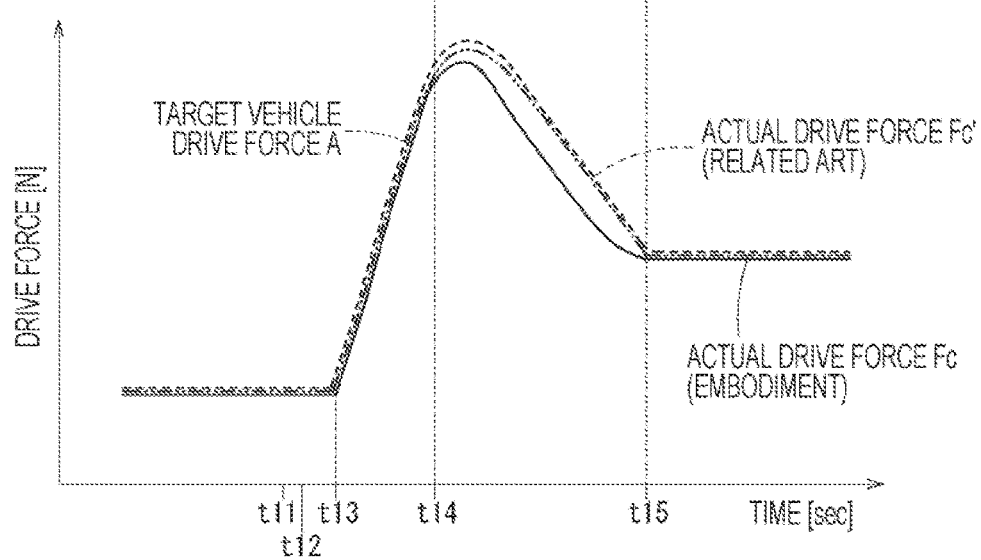
FIG. 3B is a graph illustrating a target vehicle drive force, the actual drive force obtained by the present disclosure, and the actual drive force obtained by related art that vary as time elapses.

FIG. 3A is a graph illustrating the target vehicle drive force A, the target transmission capacity B, the target motor drive force C, and the specified drive force C" that vary as time elapses. FIG. 3B is a graph illustrating the target vehicle drive force A, the actual drive force Fc obtained by the present disclosure, and the actual drive force Fc' obtained by related art that vary as time elapses. FIGS. 3A and 3B illustrate changes in the target values, the specified value, and the rated value when the target motor drive force C does not reach the limit value C' or the limit value C' is not set. It is to be noted that in FIGS. 3A and 3B, in order to facilitate visual recognition of the changes in the target values, the specified value, and the rated value, overlapping portions are shifted.

As illustrated in FIG. 3A, before time t11, the vehicle 10 performs EV drive that uses the second and third motors 16, 18 as the power source. At time t11, a driver further depresses the accelerator pedal 72. At time t12, the ECU 28 determines whether or not switching is performed from the drive (EV drive) by the second and third motors 16, 18 to the drive (ENG drive) by the engine 12, based on, for instance, the gear level set by the AP opening θap, the vehicle speed V, and the transmission 34. Here, the ECU 28 determines that switching to ENG drive is necessary, and starts the engine 12. At this point, when the engine 12 is already in operation, it is unnecessary to start the engine 12. At time t13, the ECU 28 increases the target vehicle drive force A. As the target vehicle drive force A is increased, the specified drive force C" is also increased.

Although the drive force F1 of the first power source 38 is not illustrated in FIGS. 3A and 3B, after time t13 (or after time t12), the ECU 28 monitors the engine 12 and determines whether or not the engine 12 has been started. At this point, the drive force F1e of the engine 12 may be monitored. The ECU 28 continues EV drive and until the engine 12 is started, and controls the output of the second and third motors 16, 18 based on the target motor drive force C. In other words, the ECU 28 assigns the target motor drive force C to the specified drive force C".

At time t14, the start of the engine 12 is completed. After the engine 12 has been started, the ECU 28 determines sharing rates for the first power source 38 and the second power source 44 in order to achieve the target vehicle drive force A, and determines the target transmission capacity B based on the sharing rate for the first power source 38. The ECU 28 then controls the hydraulic pressure P based on the target transmission capacity B, and engages the first clutch 30. At this point, the ECU 28 controls the engine 12 so that the drive force F1e of the engine 12 at least exceeds the target transmission capacity B. The engagement of the first clutch 30 allows the drive force F1' to be transmitted to the rear wheel 42. In addition, the ECU 28 determines the specified drive force C" by the calculation, C×(A−B)/A [=C×{1−(B/A)}], and controls the drive force F2 of the second and third motors 16, 18 based on the determined specified drive force C". The specified drive force C" is decreased as the target transmission capacity B is increased. In this manner, at time t14 and after, the drive force F1' outputted from the first clutch 30 is increased and the drive force F2 of the second and third motors 16, 18 is decreased.

At time t15, the target vehicle drive force A and the target transmission capacity B determined by the ECU 28 are approximately equal. As a consequence, the specified drive force C" becomes approximately zero. At this point, the actual drive force Fc of the vehicle 10 is approximately equal to the target transmission capacity B. In other words, switching from EV drive to ENG drive is completed. It is to be noted that the engagement of the first clutch 30 increases the target transmission capacity B sufficiently to allow the drive force F1 to be transmitted. For this reason, the target transmission capacity B at time t15 and after is not illustrated in FIG. 3A.

Here, let B" (see FIG. 3A) be the difference between the target motor drive force C and the specified drive force C", then note that the relationship B/A=B"/C is satisfied.

The actual drive force Fc obtained in this embodiment is compared with the actual drive force Fc' obtained by related art. As illustrated in FIG. 3B, the actual drive force Fc' is approximately equal to the target vehicle drive force A between time t11 and time t15. Thus, overshoot, in which the actual drive force Fc' exceeds the target vehicle drive force A, is likely to occur. In particular, an occurrence of overshoot in the latter half of a transitional stage of the control of switching, in which the target vehicle drive force A is decreased, is not preferable. In contrast, since the actual drive force Fc in this embodiment gradually approaches the target vehicle drive force A, no overshoot occurs.

(2-3. Processing Flow of Switching Control)

Figure 4:
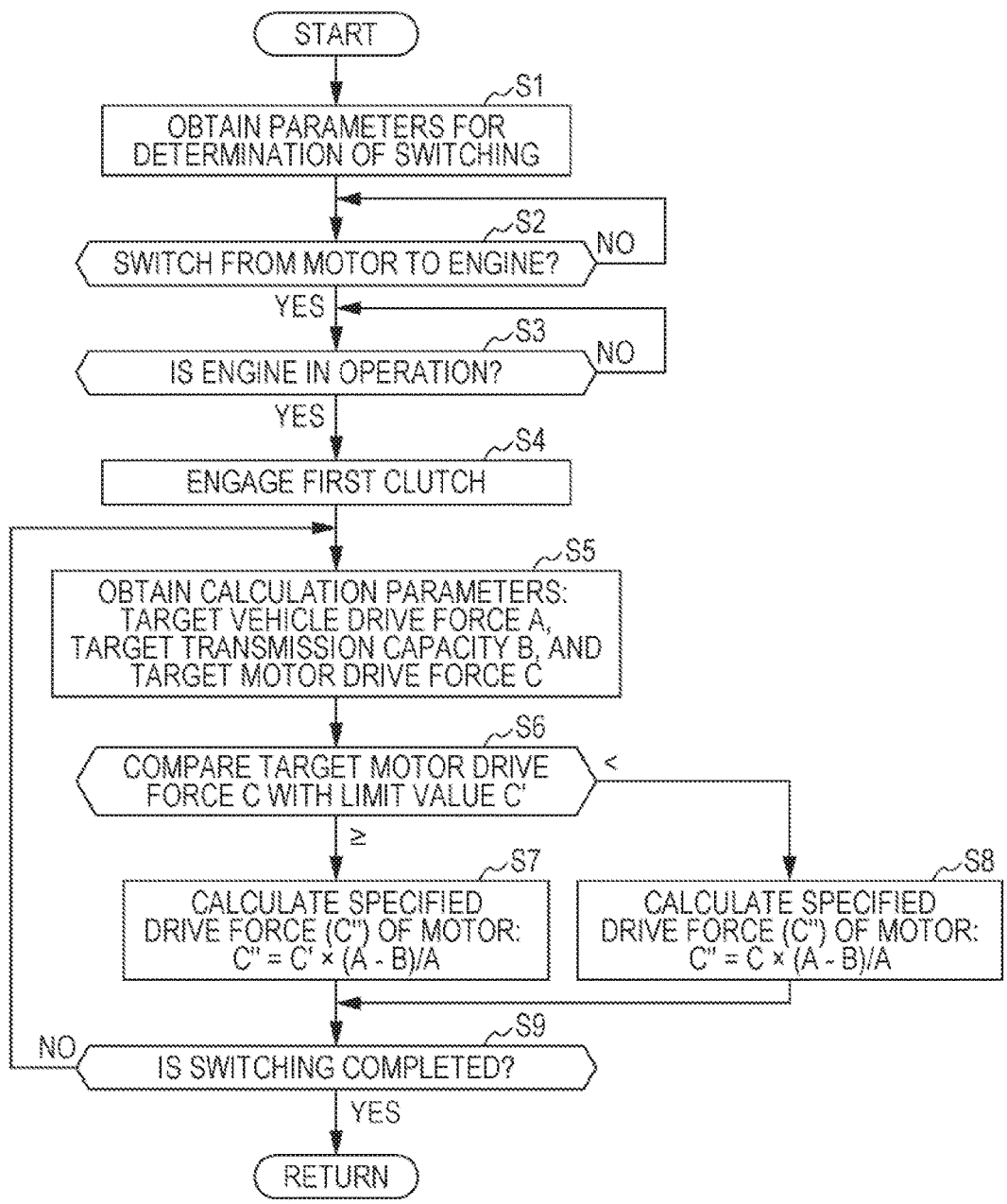
FIG. 4 is a flowchart illustrating switching control to switch from a second power source to a first power source in this embodiment.

FIG. 4 is a flowchart illustrating switching control to switch from the second power source 44 to the first power source 38 in this embodiment. The series of processing illustrated in FIG. 4 are primarily executed by the ECU 28 (the power controller 56 unless particularly stated). The series of processing illustrated in FIG. 4 are executed in a period when the vehicle 10 performs EV drive that uses the second and third motors 16, 18, and in a transitional stage of the control of switching from EV drive that uses the second and third motors 16, 18 to ENG drive that uses the engine 12.

In step S1 illustrated in FIG. 4, the ECU 28 obtains parameters necessary for determination for switching between the power sources, such as the AP opening θap and the vehicle speed V. In step S2, the ECU 28 determines whether or not switching is performed from the drive (EV drive) by the second and third motors 16, 18 to the drive (ENG drive) by the engine 12, based on, for instance, the gear level set by the AP opening θap, the vehicle speed V, and the transmission 34 (time t1 in FIG. 2A and time t11 in FIG. 3A). An algorithm for determination is stored in the memory 54. When switching is performed (YES in step S2), the processing flow proceeds to step S3. When the engine 12 is not in operation at this point, the ECU 28 starts the engine 12 (time t2 in FIG. 2A and time t12 in FIG. 3A). On the other hand, when switching is not performed (NO in step S2), the processing flow returns to step S1 and EV drive is continued.

In step S3, the ECU 28 determines whether or not the engine 12 is in operation. When the engine 12 is in operation (YES in step S3), the processing flow proceeds to step S4. On the other hand, when the engine 12 is not in operation (NO in step S3), the processing in step S3 is repeated. In step S4, the clutch controller 58 controls the hydraulic pressure P based on the target transmission capacity B, and engages the first clutch 30 (time t5 in FIG. 2A and time t14 in FIG. 3A).

In step S5, the ECU 28 obtains parameters necessary for calculating the specified drive force C" of the second and third motors 16, 18. Here, the target vehicle drive force A and the target transmission capacity B are determined again based on the AP opening θap and the vehicle speed V. The target transmission capacity B is then subtracted from the target vehicle drive force A, thereby determining the target motor drive force C (=A−B) of the second and third motors 16, 18.

In step S6, the ECU 28 compares the target motor drive force C with the limit value C' of the second and third motors 16, 18. When the target motor drive force C is greater than or equal to the limit value C' in step S6), the processing flow proceeds to step S7. On the other hand, when the target motor drive force C is less than the limit value C' (<in step S6) or the limit value C' is not set, the processing flow proceeds to step S8.

In step S7, the ECU 28 calculates the specified drive force C" of the second and third motors 16, 18. Here, the specified drive force C" is determined by multiplying the limit value C' by (A−B)/A. The ECU 28 then controls the operation of the second and third inverters 24, 26 based on the specified drive force C". As a consequence, the drive force F2 of the second and third motors 16, 18 is controlled.

In step S8, the ECU 28 calculates the specified drive force C" of the second and third motors 16, 18. Here, the specified drive force C" is determined by multiplying the target motor drive force C by (A−B)/A. The ECU 28 then controls the operation of the second and third inverters 24, 26 based on the specified drive force C". As a consequence, the drive force F2 of the second and third motors 16, 18 is controlled.

In step S9, the ECU 28 determines whether or not the processing of switching from the second power source 44 to the first power source 38 is to be completed. For instance, when the target vehicle drive force A is achieved by the drive force F1' of the engine 12 outputted from the first clutch 30, determination of completion may be made. Specifically, when the target vehicle drive force A is equal to the target transmission capacity B, determination of completion may be made. Alternatively, the drive force F1' outputted from the first clutch 30 is determined based on the hydraulic pressure P and when the drive force F1' has reached the target vehicle drive force A, determination of completion may be made. In the case of determination of completion (YES in step S9), the series of processing in step S1 to step S9 are completed (time t6 in FIG. 2A and time t15 in FIG. 3A). On the other hand, in the case of determination of continuation (NO in step S9), the processing flow returns to step S5.

Figure 5:
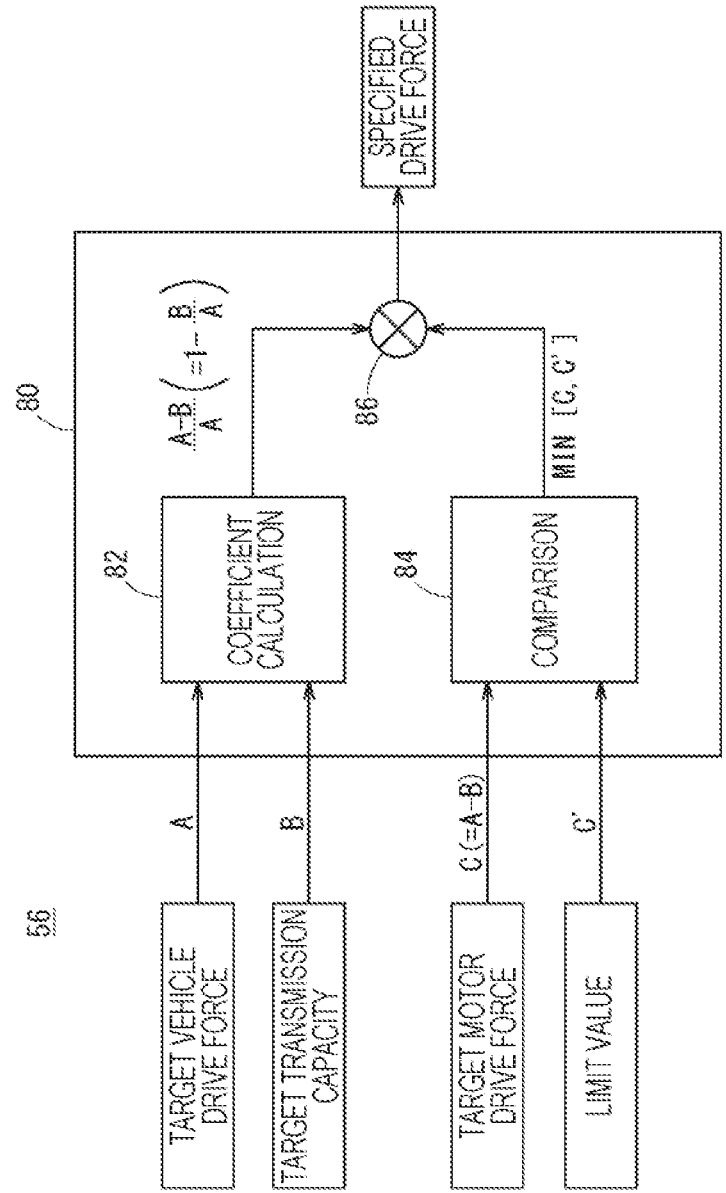
FIG. 5 is a block diagram in which each block represents a calculation step performed by a power controller of an ECU.

FIG. 5 is a block diagram in which each block represents a calculation step performed by the power controller 56 of the ECU 28. Each block of calculation step illustrated in FIG. 5 corresponds to one of the processing performed in step S5 to step S8 illustrated in FIG. 4.

The power controller 56 performs the calculation indicated by each block in a calculation block 80. The calculation block 80 includes a coefficient calculation block 82, a comparison block 84, and a multiplication block 86. The coefficient calculation block 82 receives an input of the target vehicle drive force A and the target transmission capacity B, and calculates (A−B)/A [=1−(B/A)]. The comparison block 84 receives an input of the target motor drive force C and the limit value C', and outputs MIN[C, C'] which is the value of a smaller one of C and C'. The multiplication block 86 multiplies the value MIN[C, C'] outputted from the comparison block 84 by the coefficient (A−B)/A outputted from the coefficient calculation block 82. As a result of the calculation performed by the multiplication block 86, C×(A−B)/A or C'×(A−B)/A is determined, and the result of the calculation is assigned to the specified drive force C".

Although the control of switching from EV drive that uses only the second and third motors 16, 18 to ENG drive that uses only the engine 12 has been described so far, it is also possible to use the engine 12 and the first motor 14 concurrently as the first power source 38. When the first motor 14 can output the drive force F1m greater than the second and third motors 16, 18 output, as a substitute for the engine 12, only the first motor 14 may be used. It is possible to determine the drive force F1m of the first motor 14 based on the output characteristics of the first motor 14.

[3. Conclusion of this Embodiment]

The vehicle 10 according to this embodiment includes: the first power source 38 (the engine 12 and the first motor 14) that drives the rear wheel 42; the second power source 44 (the second and third motors 16, 18) that drives the front wheel 36; the first clutch 30 that is provided on a power transmission path between the rear wheel 42 and the first power source 38, and that is disengaged or engaged according to a pressure to cause the power transmission path to be a disconnected state or a connected state; the accelerator pedal 72 (target power input unit) that receives an input from a driver for setting a target vehicle drive force A that is a target value of generated by the first power source 38 and the second power source 44, and setting a target transmission capacity B that is a target value of an output limit value of the first clutch 30; the power controller 56 that controls the first power source 38 and the second power source 44 based on the target vehicle drive force A; and the clutch controller 58 that controls the hydraulic pressure P to be applied to the first clutch 30, based on the target transmission capacity B. The power controller 56, when switching from drive by the second power source 44 to drive by the first power source 38, determines the specified drive force C" of the second power source 44 based on the ratio of the target transmission capacity B to the target vehicle drive force A, and controls the second power source 44 based on the specified drive force C".

The vehicle 10, when switching from drive by the second power source 44 to drive by the first power source 38, determines the specified drive force C" of the second power source 44 based on the ratio B/A of the target transmission capacity B to the target vehicle drive force A, and controls the second power source 44 based on the specified drive force C". When the second power source 44 is controlled with the specified drive force C" determined by the ratio B/A, the overshoot in which the actual drive force Fc of the vehicle 10 exceeds the target vehicle drive force A can be suppressed more compared with the case where the second power source 44 is controlled with the specified drive force C" determined by subtraction. As a consequence, switching between the power sources can be smoothly performed. In addition, even when an error occurs in the target vehicle drive force A and the target transmission capacity B, the effect of the error on the specified drive force C" can be reduced by using the ratio B/A.

In this embodiment, the target value (target transmission capacity B) of the output limit value of the first clutch 30 is used instead of the actual drive force Fc transmitted from the first power source 38 to the rear wheel 42 via the first clutch 30. Although the actual drive force Fc is estimated from the actual measurement value of the hydraulic pressure P applied to the first clutch 30, an error is included in the estimated value. However, the target value is not affected by the error. Although an estimated value of the actual drive force Fc is affected by a disturbance, the target value is not affected by a disturbance. In addition, when an estimated value of the actual drive force Fc is used, a control delay occurs, whereas when the target value is used, no control delay occurs.

Specifically, the power controller 56 determines the specified drive force C" of the second power source 44 using (A−B)/A [=1−(B/A)]. More specifically, the power controller 56 determines the target drive force C of the second power source 44 by subtracting the target transmission capacity B from the target vehicle drive force A. The power controller 56 then determines the specified drive force C" of the second power source 44 by multiplying the value of smaller one of the target motor drive force C and the limit value C' by 1−(B/A). As time elapses, B/A approaches 1, and thus 1−(B/A) approaches 0. Therefore, the specified power C" of the second power source 44 can be gradually made closer to 0 by multiplying the value of smaller one of the target motor drive force C and the limit value C' by 1−(B/A). As a consequence, switching between the power sources can be smoothly performed.

II. Modifications

It is to be noted that the present disclosure in not limited to the embodiment, and it goes without saying that various configurations may be adopted based on the description of the present application. For instance, the following configuration may be adopted.

[1. Vehicle 10 (Application Object)]

In the embodiment, a description has been given for the vehicle 10 which is a four-wheeled automobile (FIG. 1). However, for instance, when attention is focused on the relationship between the engine 12 and the first to third motors 14, 16, 18, it is seen that the present disclosure is applicable to a vehicle other than a four-wheeled automobile. For instance, the vehicle 10 can be any one of three-wheeled automobile and six-wheeled automobile.

In the embodiment, the vehicle 10 has one engine 12 and three traction motors 14, 16, 18 as the drive sources. However, the combination of drive sources is not limited to this. For instance, the vehicle 10 may have one or more traction motors for the rear wheel 42, and one or more traction motors for the front wheel 36 as the drive sources. For instance, only one traction motor may be used for the rear wheel 42 or for the front wheel 36. In this case, the drive force may be distributed to the right and left wheels using a differential gear. Also, a configuration may be adopted in which an individual traction motor (including so-called in-wheel motor) is assigned to each of the wheels.

Figure 6:
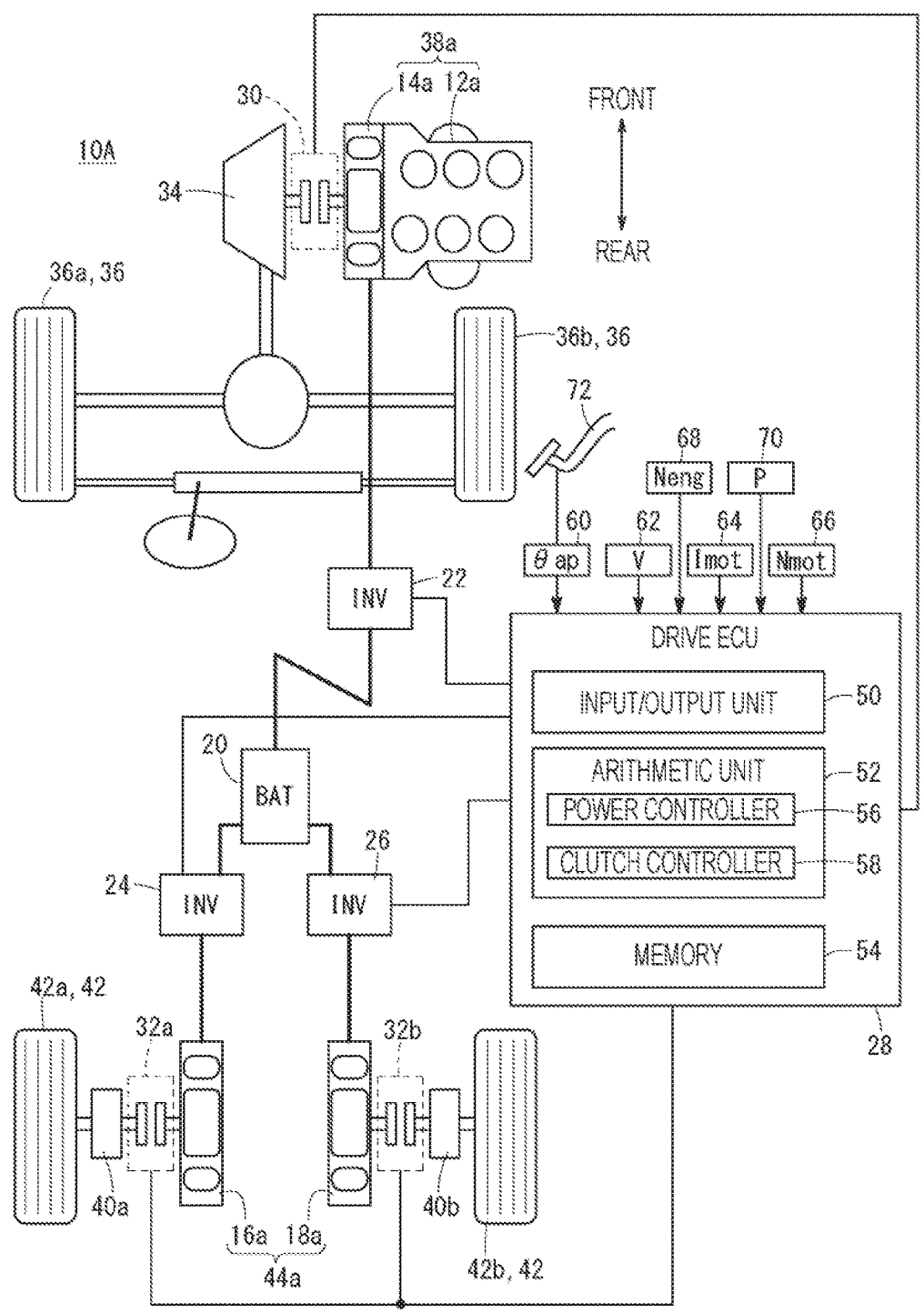
FIG. 6 is a schematic configuration diagram of a drive system and its periphery of a vehicle according to a modification of the present disclosure.

FIG. 6 is a schematic configuration diagram of a drive system and its periphery of a vehicle 10A according to a modification of the present disclosure. In the vehicle 10A, the arrangement of the first power source 38 and the second power source 44 of the vehicle 10 according to the embodiment is reversed. Specifically, a second power source 44a of the vehicle 10A includes second and third drive motors 16a, 18a that are disposed in the back of the vehicle 10A. Also, a first power source 38a of the vehicle 10A includes an engine 12a and first traction motor 14a that are disposed in series in the front of the vehicle 10A.

[2. First to Third Traction Motors 14, 16, 18]

In the embodiment, the first to third traction motors 14, 16, 18 are three-phase AC brushless motors. However, the present disclosure is not limited to this. For instance, the first to third traction motors 14, 16, 18 may be three-phase AC brush type, single-phase AC type, or DC type. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicle comprising:
    a first power source that drives a wheel;
    a second power source that drives the wheel or another wheel;
    a clutch that is provided on a power transmission path between the wheel and the first power source, and that is disengaged or engaged according to a pressure applied to the clutch to cause the power transmission path to be a disconnected state or a connected state;
    a target power input device that receives an input from a driver for setting a target vehicle power that is a target value of power generated by the first power source and the second power source, and setting a target transmission capacity of the clutch that is a target value of an output limit value of the clutch;
    a power controller that controls the first power source and the second power source based on the target vehicle power; and
    a clutch controller that controls the pressure to be applied to the clutch, based on the target transmission capacity,
    wherein the power controller, in case of switching from drive by the second power source to drive by the first power source, determines a specified power of the second power source by using a ratio of the target transmission capacity to the target vehicle power, and controls the second power source by using the specified power.

2. The vehicle according to claim 1,
    wherein the power controller determines the specified power of the second power source using:

1−(the target transmission capacity/the target vehicle power).

3. The vehicle according to claim 2,
    wherein the power controller determines a target power of the second power source by subtracting the target transmission capacity from the target vehicle power, and determines the specified power of the second power source by multiplying the target power of the second power source by 1−(the target transmission capacity/the target vehicle power).

4. The vehicle according to claim 1, wherein the clutch controller, during the transition from the drive by the second power source to the drive by the first power source, increases the target transmission capacity so as to reach the target vehicle power.

5. A vehicle comprising:
    a first power source that drives a wheel;
    a second power source that drives the wheel or another wheel;
    a clutch that is provided on a power transmission path between the wheel and the first power source, and that is disengaged or engaged according to a pressure applied to the clutch to cause the power transmission path to be a disconnected state or a connected state;
    a target power input device that receives an input from a driver for setting a target vehicle power that is a target value of power generated by the first power source and the second power source, and setting a target transmission capacity of the clutch that is a target value of an output limit value of the clutch;
a power controller that controls the first power source and the second power source based on the target vehicle power; and
a clutch controller that controls the pressure to be applied to the clutch, based on the target transmission capacity, wherein the power controller
during transition from the drive by the second power source to the drive by the first power source, determines the specified power of the second power source by using the ratio of the target transmission capacity to the target vehicle power, and controls the second power source by using the specified power.

\* \* \* \* \*